United States Patent [19]

Franssen et al.

[11] 4,086,431
[45] Apr. 25, 1978

[54] COMPRESSION SYSTEM

[75] Inventors: Nico Valentinus Franssen; Karel Elbert Kuijk, both of Eindhoven; Johannes Willem Siebelink, Arnhem, all of Netherlands

[73] Assignee: U.S. Philips Corporation, New York, N.Y.

[21] Appl. No.: 757,297

[22] Filed: Jan. 5, 1977

[30] Foreign Application Priority Data

Jan. 30, 1976 Netherlands .......................... 7600932

[51] Int. Cl.[2] .............................................. G10L 1/00
[52] U.S. Cl. ............................ 179/1 SA; 179/15.55 R
[58] Field of Search ...................... 179/15.55 R, 1 SA

[56] References Cited

U.S. PATENT DOCUMENTS

| 3,139,487 | 6/1964 | Logan et al. | 179/15.55 R |
| 3,211,833 | 10/1965 | Warns | 179/1 SA |
| 3,471,648 | 10/1969 | Miller | 179/15.55 |

Primary Examiner—Kathleen H. Claffy
Assistant Examiner—E. S. Kemeny
Attorney, Agent, or Firm—Frank R. Trifari; Henry I. Steckler

[57] ABSTRACT

System for the vocoder transmission of speech signal with reduced bandwidth. The speech signal is split into a low-frequency part and a high-frequency part. The high-frequency part is subdivided into a number of sub-bands and for each sub-band a control signal with reduced bandwidth is transmitted. A control signal is representative for the ratio between the energy in the sub-band of the speech signal and the energy in the corresponding sub-band of a reference signal with high-frequency components, which is produced from the low-frequency part of the speech signal.

6 Claims, 3 Drawing Figures

COMPRESSION SYSTEM

BACKGROUND OF THE INVENTION

(1) Field of the Invention

The invention relates to the transmission of speech signals with reduced bandwidth.

Many different systems for reducing the bandwidth of speech signals are known. These various systems are classified under the common heading vocoder.

The invention particularly relates to voice-excited vocoders. In such a vocoder the low-frequency components of the speech to a frequency which typically is about 800 Hz are not modified but the band of the high-frequency components is subdivided into a plurality of sub-bands and from each sub-band a control signal with a reduced bandwith is derived which is representative of the energy in the relevant sub-band.

Vocoders which comprise a filter unit for analyzing the speech are usually called channel-vocoders. The vocoders discussed in the above paragraph are indicated as channel-vocoders with voice-excitation.

(2) Description of the Prior Art

U.S. Pat. No. 3,030,450 discloses a channel-vocoder with voice-excitation. In the receiver station high-frequency components are reproduced from the non-modified low-frequency band. This band of high-frequency components is used as a common excitation signal which is modulated by the control signals with reduced bandwith for reconstructing the high-frequency parts of the original speech. The reconstructed high-frequency part is then combined with the non-modified low-frequency part for synthetizing a speech signal of a good quality.

According to the U.S. Pat. No. 3,030,450 the arrangement for producing high-frequency components from the non-modified low-frequency band may comprise a non-linear network the output signal of which is applied to a pulse width converter which is controlled by a sawtooth generator. The output signal thereof is applied to a plurality of channel modulators to which also the control signals with reduced bandwidth are supplied. The output signals of the channel modulators are combined with one another by the intermediary of channel filters to a replica of the band of high-frequency components of the original speech.

An alternative arrangement is known from U.S. Pat. No. 3,139,487. This arrangement comprises, in this sequence, a rectifier, a differentiator, a filter unit and an amplitude limiter or a circuit with automatic volume control, connected to each filter of the filter unit. The output signals of the amplitude limiters or the circuits with automatic volume control are applied to the channel modulators to which also the control signals with reduced bandwidth are applied. The output signals of the channel modulator are combined in the same manner as in U.S. Pat. No. 3,030,450.

For a proper operation of these vocoders it is of importance that the frequency spectrum of the excitation signal is flat. The arrangements described above only supply an approximation of a flat spectrum, which approximation also depends on the nature of the unmodified low-frequency part of the speech signal.

Furthermore, for a proper operation of these vocoders it is of importance that the channel modulators have a linear transmission characteristic over a wide dynamic range of, typically, approximately 60 dB.

SUMMARY OF THE INVENTION

It is an object of the invention to provide a channel vocoder with voice excitation in which the excitation signal need not have a flat spectrum so that a simple non-linear processing of the non-modified low-frequency part of the speech signal will do and in which the channel modulators need not have a linear transmission characteristic.

In brief, these and other objects are achieved by taking a ratio between the energy in each of the sub-bands of a band of high frequency components of the speech signal with respect to the energy in the corresponding sub-bands of a band of high frequency components which are produced from the low frequency components of the speech signal.

The system for the transmission of speech signals with reduced bandwidth, comprising in the transmitter station a source of speech signals, means for dividing the speech signals into a band of low-frequency components and a band of high-frequency components, means for deriving from the band of high-frequency components of the speech signals a plurality of control signals with reduced bandwidth, which are representative for a corresponding plurality of sub-bands of the band of high-frequency components of the speech signal, means for transmitting the band of low-frequency components of the speech signals and of the control signals to a receiver station and, in the receiver station, means for producing an excitation signal with high-frequency components from the band of low-frequency components of the speech signal, means for dividing the excitation signal into sub-bands which correspond with the sub-bands for which the control signals are representative, means for modulating the sub-bands of the excitation signal with the corresponding control signal and means for combining the modulated sub-bands of the excitation signal with the low-frequency components of the speech signal is characterized, in accordance with the invention in that in the transmitter station the means for deriving control signals with reduced bandwidth for each sub-band comprise a device for determining the ratio between the energy in the sub-band of the band of high-frequency components of the speech signal and the energy in the corresponding sub-band of a band of high-frequency components which is produced from the band of low-frequency components of the speech signal.

SHORT DESCRIPTION OF THE FIGURES

DESCRIPTION OF THE EMBODIMENTS

Figure 1:
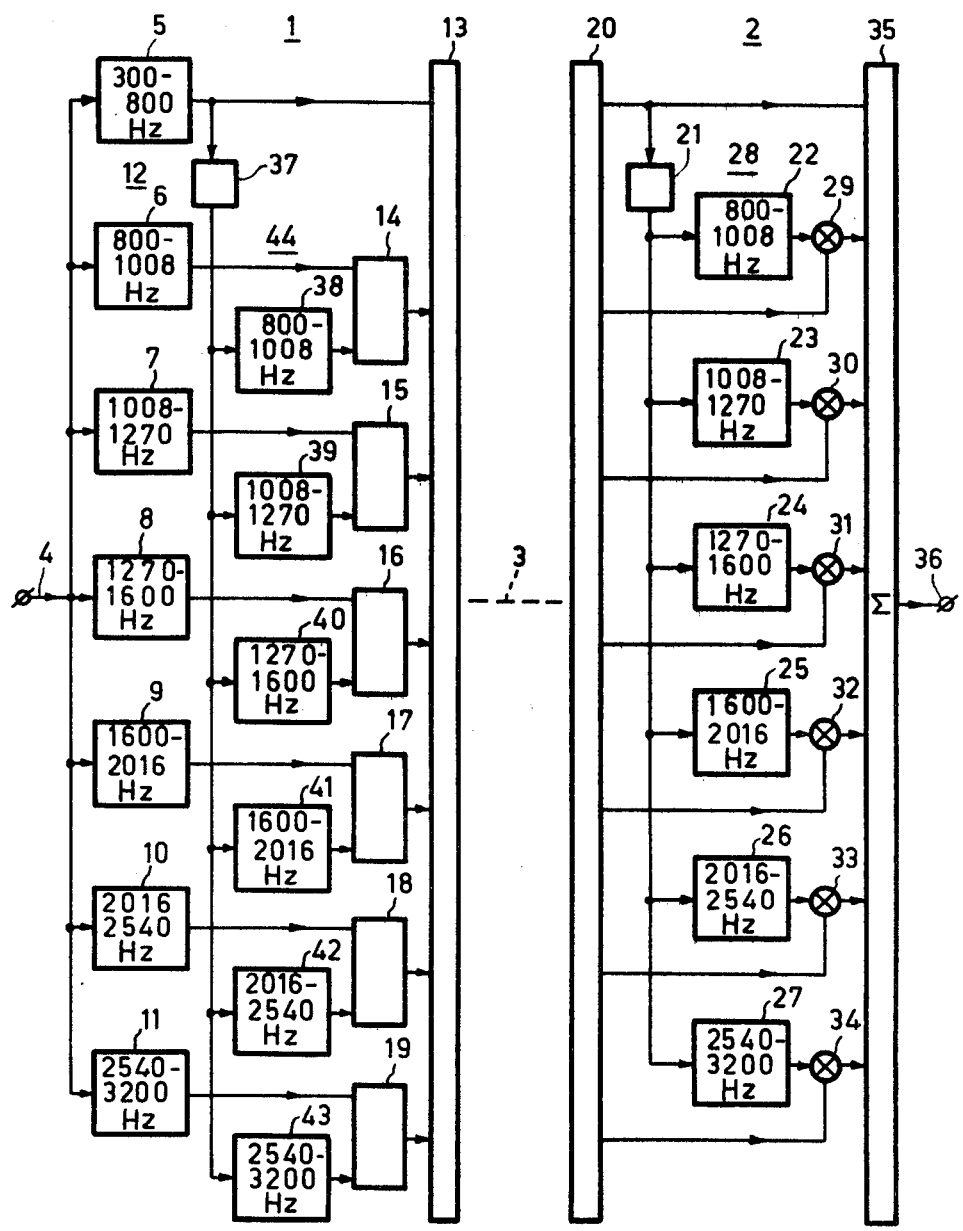
FIG. 1 is a block diagram of a system according to the invention.

The system according to FIG. 1 comprises a transmitter station 1 and a receiver station 2 which are interconnected through a telephone channel 3 with a reduced bandwidth.

In the transmitter station the speech signal is applied to the input 4. The speech signal is divided by filter 5 and by the filters 6 to 11 of filter unit 12 into a band of low-frequency components of 300–800 Hz and into a band of high-frequency components with frequencies which exceed 800 Hz.

The band of low-frequency components (base-band signal) is transmitted non-modified to the receiver station for which purpose the output of filter 5 is connected directly to the multiplexer 13.

The band of high-frequency components of the speech signal from 800 Hz upwards is split into a plurality (6) of sub-bands by the filters 6 to 11 of filter unit 12.

For each sub-band of the speech signal a control signal with reduced bandwidth of, typically, approximately 25 to 50 Hz is produced. These control signals are applied to the multiplexer 13 by the devices 14 to 19.

The multiplexer 13 transmits the base-band signal and the control signals in a band of approximately 1000 Hz to the receiver station 2.

The demultiplexer 20 of receiver station 2 supplies the base-band signal and the six control signals to its outputs.

The base-band signal is applied to a device 21 which produces an excitation signal with high-frequency components by means of a non-linear processing of the base-band signal. This non-linear processing may, for example, consist of rectification of the base-band signals followed by a differentiation.

The filters 22 to 27 of filter unit 28 split the excitation signal into a plurality of sub-bands. This filter unit is identical to the filter unit 12 of the transmitter station.

The sub-band signals of the excitation signal are applied to the channel modulators 29 to 34 to which also the corresponding control signals with reduced bandwidth are applied. The output signal of a channel modulator constitutes the reconstruction of the corresponding sub-band of the original speech signal.

The combination device 35 combines the base-band signal with the reconctructed sub-bands of the high-frequency part of the speech signal for forming a replica of the original speech signal at the output 36.

The improvement in this system is in that in the transmitter station 1 devices 14 to 19 are provided which produce a control signal which is a measure for the ratio between the energy in the sub-band of the high-frequency components of the speech signal and the energy in the corresponding sub-band of the reference signal which is identical to the excitation signal of the receiver station 2.

The transmitter station 1 comprises a device 37 which is identical to the device 21 of the receiver station 2.

The base-band signal is applied to device 37 which causes a reference signal with high-frequency components to be produced at the output which signal is identical to the excitation signal of the receiver station.

The filters 38 to 43 of the filter unit 44 which is identical to filter unit 28 of receiver station 2 split the reference signal into six sub-bands.

The output signal of a filter of filter unit 12 and the output signal of the corresponding filter of filter unit 44 are applied to one of the devices 14 to 19.

The devices 14 to 19 produce a control signal with reduced bandwidth which is a measure for the ratio of the energy in a sub-band of the speech signal and the energy in the corresponding sub-band of the reference signal.

Figure 2:
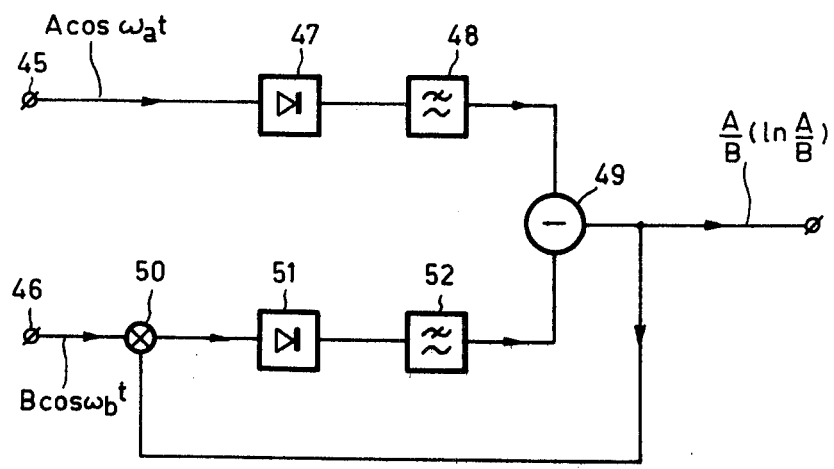
FIG. 2 is a diagram of an arrangement for producing a control signal with reduced bandwidth, which is representative for a sub-band, for use in the transmitter station of the system according to FIG. 1.

FIG. 2 shows an embodiment of the devices 14 to 19.

In FIG. 2 the sub-band of the speech signal is applied to input 45 and the sub-band of the reference signal to input 46.

The sub-band of the speech signal is rectified by rectifier 47 and subsequently applied by means of a low-pass filter 48 to a difference amplifier 49. The control signal with reduced bandwidth is produced at the output of the difference amplifier.

The sub-band of the reference signal is multiplied in a multiplier 50 by the output signal of difference amplifier 49, thereafter rectified by rectifier 51 and then by means of a low-pass filter 52 applied to a second input of difference amplifier 49.

The control loop which is constituted by the elements 49, 50, 51 and 52 tends to make the output voltage of filter 52 equal to the output voltage of filter 48.

If the signal in the sub-band of the speech signal is represented by: A cos $W_a t$ and the signal in the sub-band of the reference signal by: B cos $W_b t$ a signal proportional to A/B appears at the output of difference amplifier 49.

The low-pass filters 48 and 52 have the same cut-off frequency of, typically, approximately 25 to 50 Hz so that the control signal which is produced by difference amplifier 49 also has a (reduced) bandwidth of 25 to 50 Hz.

If $U_1$ and $U_2$ represent the signals which are applied to the multiplier 50 the transfer function of the multiplier can be written as:

$$U_3 = CU_1 \cdot U_2,$$

wherein C is a constant.

By applying a so-called exponential multiplier a logarithmic compression of the control signal can be realized.

The transfer function of this exponential multiplier can be written as:

$$U_4 = C_1 U_1 \cdot e^{C_2 U_2},$$

wherein $C_1$ and $C_2$ are constants.

By means of the equations:

$$U_1 = B$$

$U_2$ = the output signal of difference amplifier 49 and using the fact that the control loop tends to make the amplitude of $U_4$ equal to A the result obtained is:

$$U_2 = C_3 ln\, A/B + C_4,$$

wherein $C_3$ and $C_4$ are constants.

The use of control signals with a logarithmic compression as regards the ratio of the energies in the corresponding sub-bands of the speech signal and the reference signal has the evident advantage that a smaller dynamic range of the transmission path is sufficient for transferring the control signal. If a transmission in digital form is opted for, then less bits per second will be required to transmit the control signals. On the other hand, at a given bit rate a more accurate transmission over a large dynamic range of the energy ratio can be realized.

Using an exponential multiplier in the device according to FIG. 2 which is an embodiment of the devices 14 to 19 of FIG. 1 has of course the consequence that the channel modulators 29 and 34 in receiver station 2 are also of the exponential type.

The channel modulators receive as input signal $U_1$: the sub-band of the excitation signal, represented here above by B cos $W_b t$ and as input signal $U_2$: the control signal with reduced bandwidth which is proportional to $\ln A/B$ so that the input signal $U_4$ is proportional to $A \cos W_b t$, as desired.

Figure 3:
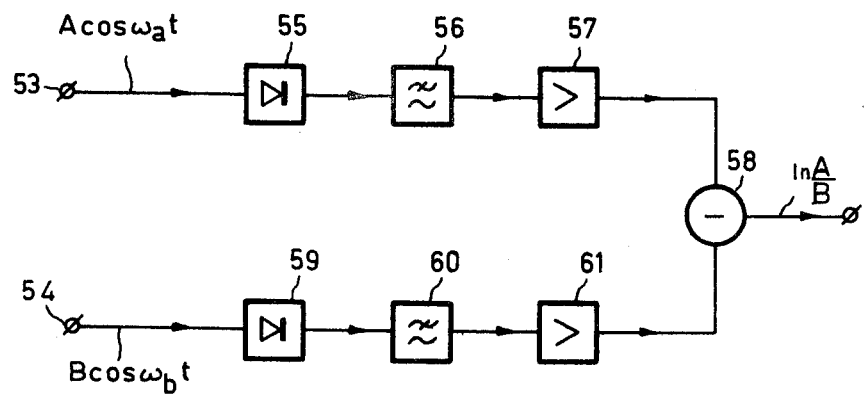
FIG. 3 is a diagram of a second arrangement for producing a control signal with reduced bandwidth.

FIG. 3 shows a second embodiment of the devices 14 to 19 of the transmitter station 1 of the system of FIG. 1. Also in this embodiment a logarithmic compression of the energy ratio is realized.

The sub-band of the speech signal is applied to input 53 and the sub-band of the reference signal is applied to input 54.

The sub-band of the speech signal is rectified by rectifier 55, thereafter filtered by low-pass filter 56 and subsequently applied to an input of difference amplifier 58 by means of a logarithmic amplifier 57.

The sub-band of the reference signal is rectified by rectifier 59, thereafter filtered by low-pass filter 60 and subsequently applied to a second input of difference amplifier 59 by means of a logarithmic amplifier 61.

The low-pass filters have a cut-off frequency of, typically, approximately 15 to 50 Hz. At the output of difference amplifier 58 a control signal is produced which is proportional to the logarithm of the ratio between the energies in the two sub-bands and having a bandwidth of 25 to 50 Hz.

It is advantageous in the embodiment of FIG. 3 that the accuracy of the control does not depend on the amplitude of the input signals, that a large dynamic range (60 dB) can be realized and that there is no feedback control loop but a forward control so that there is no risk for instability and consequently filters with a steep cut-off characteristic may be used.

The use of devices 14 to 19 in the embodiment according to FIG. 3 has the consequence that the channel modulators 29 to 34 of the receiver station 2 are of the exponential type, as described above in conjunction with a variant of FIG. 2.

It is advantageous to interchange in receiver station 2 the filters 22 to 27 inclusive with the channel modulators 29 to 34 inclusive, so that any distortion occurring in the channel modulators can be eliminated by the filters.

What is claimed is:

1. A transmitter vocoder for transmitting speech signals comprising, means for receiving and dividing the speech signals into a band of low-frequency components and a band of high-frequency components, means for deriving from the band of high-frequency components of the speech signal a plurality of control signals with reduced bandwidth which are representative of a corresponding number of sub-bands of the band of high-frequency components of the speech signal, means for producing corresponding bands of high frequency components from the band of low frequency components, and means for transmitting the band of low-frequency components of the speech signal and the control signals, the means for deriving the control signals with reduced bandwidth from each sub-band comprising a device means for determining the ratio between the energy in the sub-band of the band of high-frequency components of the speech signal and the energy in the corresponding sub-band of said band of high-frequency components which is produced from the band of low-frequency components of the speech signal.

2. A transmitter as claimed in claim 1, wherein that ratio determining means comprises for each sub-band first means for rectifying the signal in the sub-band of the speech signal, second means for filtering with reduced bandwidth the output signal of the first means, third means for multiplying the signal in the corresponding sub-band of the band of high-frequency components which is produced from the band of low-frequency components of the speech signal by the output signal of difference producing means, fourth means for rectifying the output signal of the third means and fifth means for filtering with reduced bandwidth the output signal of the fourth means, wherein the difference producing means is coupled for producing the difference between the output signals of the second and fifth means thereby producing at its output the control signal with reduced bandwidth.

3. A transmitter as claimed in claim 2, wherein the first means comprises an exponential multiplier.

4. A transmitter as claimed in claim 1, wherein the ratio determining means comprises for each sub-band sixth means for rectifying the signal in the sub-band of the speech signal, seventh means for filtering with reduced bandwidth the output signal of the sixth means, eighth means for logarithmically amplifying the output signal of the seventh means, ninth means for rectifying the signal in the corresponding sub-band of the band of high-frequency components which is produced from the band of low-frequency components of the speech signal, tenth means for filtering with reduced bandwidth the output signal of the ninth means, eleventh means for logarithmically amplifying the output signal of the tenth means and twelfth means for producing the difference between the output signals of the eighth and eleventh means thereby producing at its output the control signal with reduced bandwidth.

5. A receiver vocoder comprising input means for receiving low frequency components of a speech signal and reduced bandwidth control signals representative of the ratio of sub-bands of high frequency components of said speech signal to corresponding high frequency components produced from said low frequency components of said speech signal, means for producing an excitation signal with high-frequency components from the band of low-frequency components of the speech signal, means for dividing the excitation signal into sub-bands which correspond to the sub-bands for which the control signals are representative, means for modulating the sub-bands of the excitation signal with the corresponding control signal, and means for combining the modulated sub-bands of the excitation signal with the low-frequency components of the speech signal.

6. A receiver as claimed in claim 5, wherein said modulating means comprises an exponential multiplier.

* * * * *